UNITED STATES PATENT OFFICE.

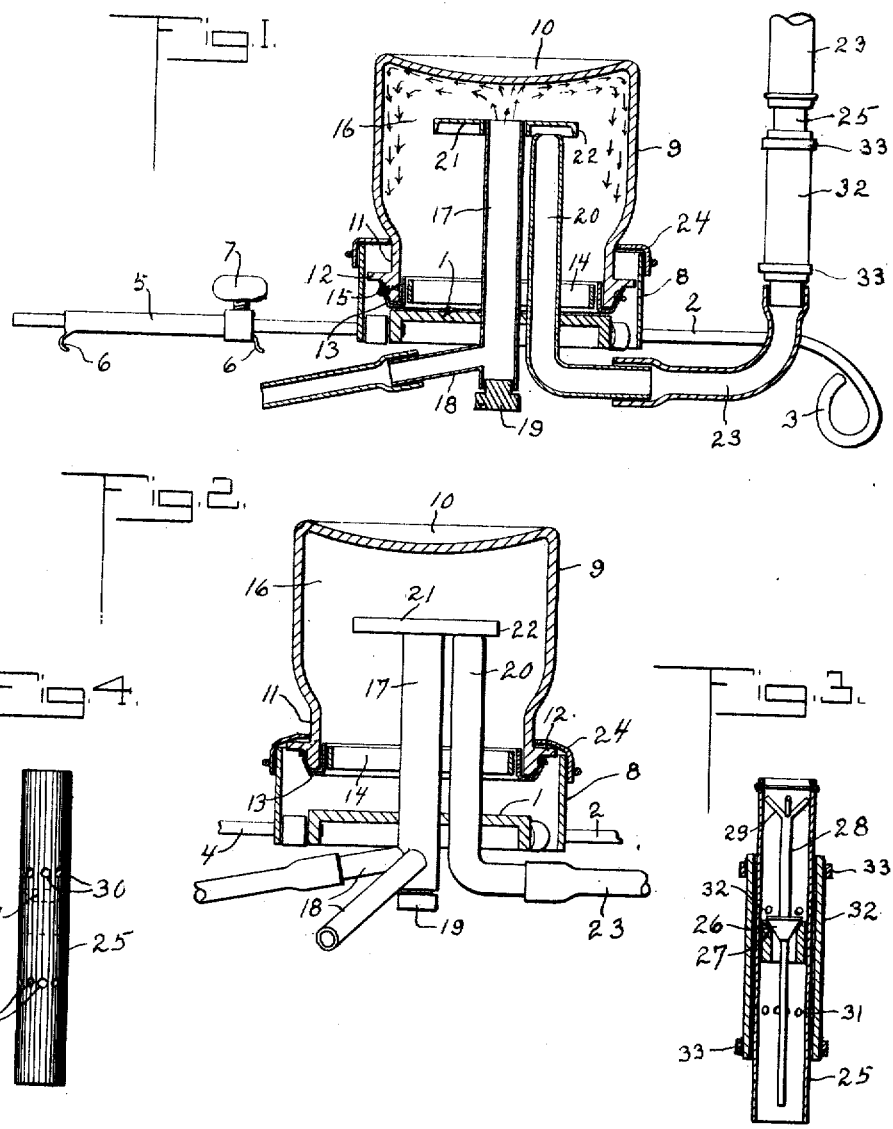

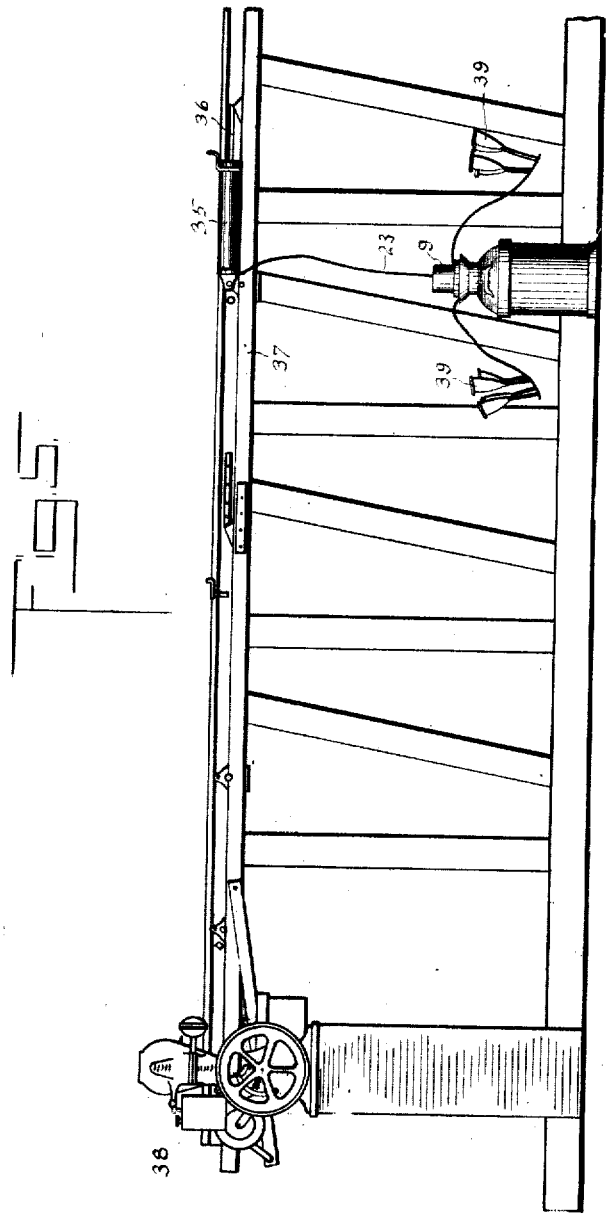

WARREN A. SHIPPERT, OF DIXON, ILLINOIS.

MILKING-MACHINE.

1,264,214.  Specification of Letters Patent.  Patented Apr. 30, 1918.

Application filed May 12, 1916. Serial No. 96,966.

*To all whom it may concern:*

Be it known that I, WARREN A. SHIPPERT, a citizen of the United States, residing at Dixon, in the county of Lee and State of Illinois, have invented certain new and useful Improvements in Milking-Machines, of which the following is a specification.

My invention relates to milking machines of the type that operate on the principle of withdrawing the milk by suction applied intermittently to the cow's udder.

One of the primary objects of the invention is to provide means for applying suction to the cow's teats in milking which will be most efficient so far as rapid withdrawal of the milk is concerned, and which will accomplish the operation without the danger of injuring the cow in any way. This feature of the invention depends upon the lengthening of each effective suction period,—that is, to the maintenance of the vacuum at what may be termed a milking intensity for a greater portion of the time in which the machine is in operation than has been possible with milking machines as they have heretofore been constructed and operated. For example, in a machine employing a reciprocating pump, operated by a motor, for creating the suction impulses (although the invention as regards this feature is not necessarily limited to this type of machine,) the piston of the pump on its suction stroke will ordinarily travel some distance before a sufficient vacuum is created to bring about the withdrawal of the milk; and this milking vacuum is destroyed almost immediately upon the beginning of the return stroke of the piston. My invention lengthens the effective suction period so that it endures during the greater part of the forward and also the return stroke of the pump. By this same arrangement it is not necessary, in the machine of my invention, to raise the vacuum above the normal milking vacuum, as has been the usual practice with machines of this type, in order to give a suction period of effective duration. By prolonging the suction impulse without raising the vacuum to too high a point at any time, my invention makes it possible to milk a cow very rapidly and without discomfort or injury to the animal. The increased efficiency of the operation makes it possible in fact to milk two cows by means of a single pump.

A further object of the invention is to provide, more particularly in the type of machine in which the pump acts directly on the cow and in which the milk is discharged into the atmosphere, a milk receiving, or vacuum chamber, which will be simple and economical in its construction and which will do away entirely with a valve.

The invention has for further objects, such other new and improved constructions, arrangements, and devices relating to milking machines, as will be hereinafter described and claimed.

Figure 1 is a vertical medial section of my invention with the chamber 9 closed. Fig. 2 is a similar view of the central part of my invention with the chamber 9 open. Fig. 3 is a longitudinal section of the pipe 19 and valve mechanism appertaining thereto. Fig. 4 shows the pipe 19 with the sleeve 24 removed. Fig. 5 illustrates one of my inventions in position, when in use in connection with a milking machine outfit.

Similar parts are indicated by corresponding reference numbers throughout the several figures.

1 represents a circular base plate adapted to be supported on the top of a can or pail by means of rods 2 (only one shown) provided on their outer ends with loops 3, and a rod 4, slidable upon which is a sleeve 5, provided at each end with a hook 6. The sleeve 5 can be held in adjusted position by means of a set screw 7.

Supported from the plate 1 and spaced apart therefrom is a circular casing 8, and loosely mounted on the plate 1 is a cylinder 9, preferably formed of glass, and having a top pan which slopes downwardly toward a central point. At its lower end the cylinder 9 is provided with a neck 11 and annular rim 12, of sufficient size to act as a guide on the inner face of the casing 8. The lower part of the rim is covered with a rubber gasket 13, held in place by a ring 14 in the mouth of the cylinder and a wire 15 on the outer face of the rim.

The cylinder 9 incloses a chamber 16, into which is introduced through the plate 1 a pipe 17 preferably provided at its lower end with a pair of branches 18 by means of which communication may be made with the usual teat-cup apparatus of a milking machine, in duplicate. The lower end of the pipe 17 is provided with a plug 19, which can be removed for cleaning the pipe. Passing upwardly through the plate 1 near the pipe 17 is a pipe 20, which terminates at its upper end just below a circular plate 21, secured to the upper end of the pipe 17. The plate 21 is provided with a central opening and a downwardly projecting flange 22. The lower end of the pipe 20 is connected with any suitable air-pump mechanism by means of a flexible tube 23. In the operation of the air-pump, the outward or suction stroke of the piston causes a suction through the pipe 20 tending to exhaust the air in the chamber 16, holding the cylinder tightly against the plate 1, and causing a suction through the pipe 17 which operates to draw the milk through the same and into the chamber 16. The return movement of the piston forces the air back through the pipe 20, raises the cylinder 9 a short distance above the plate 1, and permits the milk to escape between the plate 1 and casing 8 into the receptacle upon which the machine is supported. The upward movement of the cylinder 9 is limited by a flexible collar 24 secured to the upper edge of the casing 8. As soon as the inner movement of the air-pump piston ceases the cylinder 9 is permitted to return to its normal position, and the jar of the cylinder upon the plate 1 in its downward movement is overcome by the gasket 13. The collar 24 not only limits the upward movement of the cylinder 9, but it prevents the escape of any portion of the milk between the rim 12 and casing 8.

In the inward movement of the milk it pours in a steady stream from the end of the pipe 17 against the center of the top 10, where it spreads in all directions, running down the sides of the cylinder and collecting in the lower part thereof. The plate 21 acts as an obstruction to the upper end of the pipe 20 and prevents any portion of the milk from getting into such pipe.

Located at any desired point in the tube 23 is a short pipe 25 in which is movable a valve 26, adapted to close on a valve seat 27 in such pipe. The valve 26 is provided with a stem 28, the upper end of which is provided with guide arms 29, which aid in holding the valve at all times in an operative position. The pipe 25 is provided at a point above the seat 27 with a series of openings 30, and a similar series of perforations 31 is located in the pipe at a point below the valve seat. Inclosing both series of perforations is an elastic sleeve 32, secured to the pipe 25 at points above and below said openings by bands 33.

Fig. 5 shows a conventional form of pump mechanism, which can be used with my device, and in which 35 indicates an air-pump, provided with a piston rod 36, connected with a reciprocate bar 37. Movement is imparted to said bar from a motor 38 suitably mounted at one end thereof. Communication is had between said air-pump and the cylinder 9 by means of the tube 23 already referred to.

In the outward stroke of the air-pump piston the valve 26 opens to permit a free passage of the air through the tube 23, but as soon as the outward movement ceases the valve is closed by gravity, interfering with the return of the air through the pipe 25. The suction of the air below the valve seat holds the sleeve 32 tightly against the perforations 31, but in the return movement of the piston the pressure of the air above the valve 26 gradually increases until it passes through the openings 30, forces the sleeve 32 away from the pipe, overcomes the suction of the air through the holes 31, and passes through such holes, relieving the vacuum in the chamber 16. The air thus passes outwardly on the inside of the pipe 25 and inwardly on the outside thereof. The inward movement is not accomplished, however, until the piston has described a large part of its return stroke, and during the time that the return movement of the air is arrested a suction is maintained in the chamber 16, and during this period the milking operation is continuous. The additional amount of capacity thus obtained makes it possible to carry on the operation with two cows at the same time. The suction is not only greatly increased, but it is not as spasmodic as in those machines that are provided with a simple air-pump apparatus, the operation hereinbefore described being more uniform and easier upon the cow.

For a successful operation of my device I find it necessary to provide a cylinder 9 of considerably larger capacity than is required for the milk alone, the additional space being utilized for suction purposes. Assuming that the milk discharged into the cylinder will occupy one-third thereof, the other two-thirds would constitute a vacuum space, in which the suction will be continuous while the return movement of the air is interrupted as described. In the return of the air through pipe 20 it strikes against the lower face of the plate 21 and is diverted downwardly until it comes in contact with the milk in the chamber 16, where it spreads outwardly to the walls of the chamber and upwardly against the same to the top 10, the pressure of the air against said top tending to raise the cylinder 9. The air then turns inwardly, but the cylinder is lifted and the pressure of the air released before the return current of air reaches the upper end of the pipe 17. There is, therefore, no entry of such air into the pipe or milking apparatus, and no tendency to relieve the suction in the teat-cups, resulting in a retention of such teat-cups in position.

No auxiliary supporting means for holding the teat-cup apparatus in position is therefore required.

The cylinder 9 may be formed of metal or other material, but by the use of glass in the construction thereof the flow of milk is at all times visible and it is possible to gage the supply.

The collar 24 is sufficiently elastic to permit a ready removal of the cylinder for the purpose of cleaning the parts of the machine.

The word "cylinder" is used to designate the chamber-forming member 9, without intending to imply that the shape of this member need be cylindrical in the geometrical sense.

What I claim as my invention, and desire to secure by Letters Patent of the United States, is:

1. A device of the class described, comprising a central chamber; a milk inlet pipe supported in said chamber so as to discharge against the upper end thereof; means for exhausting the air in said chamber; and means for discharge of the milk therefrom.

2. In a device of the class described, a cylindrical chamber having a top part inclining downwardly toward the center; a milk inlet pipe supported in said chamber so as to discharge centrally of said top; air suction and pressure means connected with said cylinder; and means for the discharge of the milk therefrom.

3. A device of the class described, comprising a base-plate; a cylinder mounted on said base-plate so as to be permitted vertical vibration thereon; a milk inlet pipe extending through said base-plate into said cylinder so as to discharge against the upper end thereof; and an air exhaust pipe passing through said base-plate and provided with an inlet near the upper part of said cylinder.

4. A device of the class described, comprising a base-plate; a cylinder mounted on said base-plate so as to be permitted vertical reciprocation thereon; a milk inlet pipe extending through said plate into said cylinder so as to discharge into the upper end thereof; an air exhaust pipe passing through said base-plate and provided with an inlet near the upper end of said cylinder; and a guard for the end of said air exhaust pipe.

5. A device of the class described, comprising a base-plate; a cylinder mounted on said base-plate so as to be permitted vertical reciprocation thereon; a milk inlet pipe extending through said plate into said cylinder so as to discharge into the upper end thereof; an air exhaust pipe passing through said base-plate and provided with an inlet near the upper end of said cylinder; a guard for the end of said air exhaust pipe; an air suction and pressure mechanism connected with said last named pipe; and valve mechanism interposed between said last named pipe and said air-pump mechanism for retarding the return movement of the air to the cylinder.

6. A device of the class mentioned comprising a base-plate, provided with means for support thereof; a casing surrounding said base-plate and spaced apart therefrom; a flexible collar supported by said casing; a cylinder mounted on said base-plate so as to be permitted vertical vibration thereon, and having its lower end engaged loosely by said collar; a milk inlet pipe extending through said plate into said cylinder so as to discharge against the upper end thereof; and an air exhaust pipe projecting through said base-plate to a point near the upper end of said cylinder.

7. A device of the class described, comprising a base-plate provided with means for support thereof; a casing surrounding said base-plate and spaced apart therefrom; a cylinder loosely mounted on said plate; a flexible collar secured to said casing and engaging the lower end of said cylinder, so as to permit vertical oscillation thereof; a milk inlet pipe extending through said base plate into said cylinder; and an air exhaust pipe projecting through said base-plate to a point near the upper end of said cylinder; and a guard plate for the upper end of said air exhaust pipe.

8. A device of the class described, comprising a base-plate having means for support thereof; a cylinder mounted on said base-plate so as to be movable away from and toward the same; a milk inlet pipe extending through said base-plate into said cylinder so as to discharge against the upper end thereof; an air exhaust pipe extending through said base-plate to a point near the upper end of said cylinder; air suction and pressure mechanism; a tube connecting said air exhaust mechanism with said last named pipe; a valve chamber located in said tube, provided with a valve seat and having openings in its walls above and below said valve seat; a valve in said valve chamber normally supported on said valve seat; and flexible means for closing the openings in the wall of said chamber.

9. A device of the class described, comprising a base-plate; a cylinder mounted on said base-plate so as to be permitted vertical reciprocation thereon; a milk inlet pipe extending through said base-plate into said cylinder to a point near the upper end thereof; an air exhaust pipe passing through said base-plate to a point slightly below the upper end of said inlet pipe; and a circular guard plate secured to the top of said inlet pipe, provided with an annular flange projecting downwardly, and acting as an obstruction to the upper end of said air exhaust pipe.

10. In a milking machine, a milk chamber having a valveless inlet and a valveless milk outlet.

11. In a milking machine, the combination with a milk conduit and an exhaust conduit, of a milk receiving chamber communicating with said conduits and comprising a stationary base and a hollow member on said base adapted to be raised to provide an opening for the discharge of milk from said receiving chamber.

12. In a milking machine, the combination with a milk conduit and an exhaust conduit, of a stationary member and a movable member providing together a milk receiving chamber communicating with said conduits, the movable member being adapted to be raised by air pressure in said chamber to provide an opening for discharge of milk from said chamber; and sealing means to provide an air tight connection between said members while the air is being exhausted from said chamber.

13. In a milking machine, the combination with a milk conduit and an exhaust conduit, of a milk receiving chamber communicating with said conduits and comprising a stationary base, and a hollow member on said base adapted to be raised to provide an opening for the discharge of milk from said receiving chamber, and guiding means on the base for guiding the movements of said hollow member.

14. In a milking machine, the combination with a milk conduit and an exhaust conduit, of a milk receiving chamber in communication with said conduits comprising a stationary disk and a hollow member movable to and from said disk.

15. In a milking machine, the combination with a milk conduit, a suction and pressure pump and conduit connected therewith, and a milk-receiving chamber communicating with said conduits and comprising a stationary base and a hollow member on said base which is raised by pressure produced on the pressure stroke of the pump to provide an opening for the discharge of milk from said chamber.

16. In a milking machine, the combination with a milk conduit, a suction and pressure pump and conduit connected therewith, of a milk receiving chamber communicating with said conduits and comprising a stationary base, and a hollow member on said base which is raised by pressure produced on the pressure stroke of the pump to provide an opening for the discharge of milk from said chamber, and sealing means which provides an air-tight connection between said hollow member and base during the suction stroke of the pump.

17. In a milking machine, the combination with a milk conduit, a suction and pressure pump and conduit connected therewith, of a milk receiving chamber communicating with said conduits and comprising a stationary base and a hollow member on said base which is raised by pressure produced on the pressure stroke of the pump to provide an opening for the discharge of milk from said chamber, sealing means which provides an air-tight connection between said hollow member and base during the suction stroke of the pump, and means on the base for guiding the movements of said hollow member.

18. In a milking machine, the combination of a milk receiving chamber comprising a base, a hollow member which rests on said base and is adapted to be raised to discharge the milk, a milk conduit extending through the base into the upper portion of the chamber, and an exhaust conduit extending through the base into said chamber.

19. In a milking machine, the combination of a milk receiving chamber comprising a base, a hollow member which rests on said base and is adapted to be raised to discharge the milk, a milk conduit extending through the base into the upper portion of the chamber, an exhaust conduit extending through the base into said chamber, and an annular shield surrounding the upper end of the milk conduit and projecting over the upper end of the exhaust conduit.

20. In a milking machine, the combination of a milk receiving chamber comprising a solid base, a hollow member which rests on said base and is adapted to be raised to discharge the milk, a milk conduit extending through the base into the upper portion of said chamber, an exhaust conduit extending through the base into said chamber, and sealing means for providing an air tight connection between the hollow member and base while air is being exhausted from said chamber.

21. In a milking machine, the combination of a milk receiving chamber, comprising a base, a hollow member which rests on said base and is adapted to be raised to discharge the milk, a milk conduit extending through the base into the upper portion of the chamber, an exhaust conduit extending through the base into said chamber, and guiding means on the base for guiding the hollow member.

22. In a milking machine, the combination of a milk receiving chamber, comprising a base, a hollow member which rests on said base and is adapted to be raised to discharge the milk, a milk conduit extending through the base into the upper portion of the chamber, an exhaust conduit extending through the base into said chamber, and a gasket on said base which bears flexibly against the side of the hollow member.

23. In a milking machine, the combination of a milk receiving chamber comprising a base, a hollow member which rests on said base and is adapted to be raised to discharge the milk, a milk conduit extending through the base into the upper portion of the chamber, a gasket on said base which bears flexibly against the side of the hollow member, and a gasket on the lower rim of the hollow member.

24. In a milking machine, the combination of a milk receiving chamber comprising a base and glass cup which rests on said base and is adapted to be raised to discharge the milk, a milk conduit extending through the base into the upper portion of the cup, and an exhaust conduit extending through the base into said cup.

25. In a milking machine, the combination of a milk receiving chamber, a milk conduit and a pump conduit communicating with said chamber, a suction and pressure pump, and a valve device in the pump conduit adapted, on the pressure stroke of the pump, to prevent a flow of air from the pump to the chamber, until a certain pressure is developed by the pump.

26. In a milking machine, the combination of a milk receiving chamber, a milk conduit and a pump conduit communicating with said chamber, a suction and pressure pump, and a valve device in the pump conduit adapted to prevent the flow of air from the pump to the chamber during the first part of the pressure stroke of the pump.

27. In a milking machine, the combination of a milk receiving chamber comprising a member moved by increase of pressure in the chamber to allow the discharge of milk therefrom, a milk conduit and a pump conduit communicating with said chamber, a suction and pressure pump, and a valve device in said pump conduit adapted, on the pressure stroke of the pump, to prevent a flow of air from the pump to the chamber until the pump has developed a given pressure.

28. In a milking machine, the combination of a milk receiving chamber comprising a fixed base and a hollow chamber on said base adapted to be raised by pressure in the chamber to allow discharge of milk therefrom.

29. In a milking machine, the combination of a milk receiving chamber, a milk conduit and a pump conduit communicating with said chamber, a suction and pressure pump, a valve in the pump conduit which opens toward the pump, and means for providing a by-pass around said valve, which is opened by pressure on the pump side of the valve.

30. In a milking machine, the combination of a milk receiving chamber, a milk conduit and a pump conduit communicating with said chamber, a suction and pressure pump, a valve in the pump conduit which opens toward the pump, and means for providing a by-pass around said valve which is opened during the latter part of the pressure stroke of the pump.

31. In a milking machine, the combination of a milk receiving chamber, a milk conduit leading to the chamber and an intermittently operating exhausting device having a connection with the chamber, and a valve device in said connection which closes communication between the exhausting apparatus and the chamber during the intervals between suction impulses, except when a certain difference in pressure is brought about between said exhaust apparatus and chamber.

32. In a milking machine, the combination of a milk receiving chamber, a milk conduit leading to the chamber, and an intermittently operating exhausting device having connection with the chamber, a check valve in said connection which opens toward the exhausting apparatus, and means for providing a by-pass around said valve which opens at a certain pressure on the exhaust apparatus side of the valve.

33. In a milking machine, the combination of a milk receiving chamber, a milk conduit leading to the chamber, and an intermittently operated exhausting device having a pipe connected with the chamber, a check valve in said pipe which opens toward the exhausting apparatus, said pipe being formed with perforations on opposite sides of said valve, and a resilient sleeve surrounding the perforated part of the pipe.

34. In a milking machine, an intermittently operating exhausting device and a conduit connected therewith provided at its outer end with teat-cup apparatus from which the air is exhausted to produce suction on the cow's udder, and a valve device in said conduit which closes during intervals between suction impulses except when a certain difference in pressure exists on opposite sides of said valve device.

35. In a milking machine, an intermittently operating exhausting device and a conduit connected therewith provided at its outer end with teat-cup apparatus from which air is exhausted to produce suction on the cow's udder, a check valve in said conduit which opens toward the exhausting device, and means for providing a by-pass around said valve which opens at a certain pressure on the exhaust apparatus side of the valve.

36. In a milking machine, an intermittently operating exhausting device and a conduit connected therewith provided at its outer end with teat-cup apparatus from which air is exhausted to produce suction on the cow's udder, a check valve in said conduit which opens toward the exhausting device, said conduit being formed with perforations on opposite sides of said valve, and a resilient sleeve surrounding the perforated portion of said conduit.

37. In a milking machine, the combination of two members providing together a milk receiving space from which the air is adapted to be exhausted, one of said members being movable away from the other to provide an opening for discharge of milk from said space, and milk and discharge conduits which extend upwardly through the other member into said space.

38. In a milking machine, the combination of means providing a milk receiving chamber, an exhaust conduit, and a milk receiving conduit, which extends vertically through the chamber, and delivers the milk against the top of the chamber, so that it flows in a film down the side wall thereof.

39. In a milking machine, the combination of means providing a milk receiving chamber, comprising a cuplike member having a smooth upper and side wall, an exhaust conduit, and a milk conduit which delivers the milk against the under side of the upper wall of the chamber.

40. In a milking machine, the combination of a stationary base, a milk conduit extending through said base, an alternating operating suction and pressure producing apparatus having a conduit extending through said base, and a hollow member arranged above the base and adapted to be drawn against the base and raised therefrom at alternating suction and pressure impulses of the aforesaid apparatus.

41. In a milking machine, the combination of a stationary base, a milk conduit extending through said base, an alternating operating suction and pressure producing apparatus having a conduit extending through said base, and a hollow member arranged above the base and adapted to be drawn against the base and raised therefrom at alternating suction and pressure impulses of the aforesaid apparatus, said milk conduit adapted to extend into the upper part of the hollow member so as to deliver the milk against the underside of the top of the same.

In testimony whereof I affix my signature in the presence of two witnesses.

WARREN A. SHIPPERT.

Witnesses:
W. N. HASKELL,
FRANK U. HASKELL.